May 21, 1946.     R. O. HENSZEY ET AL     2,400,507
METHOD AND APPARATUS FOR DETECTING DEFECTS IN FILLED CANS
Original Filed May 27, 1939     8 Sheets-Sheet 3

Patented May 21, 1946

2,400,507

UNITED STATES PATENT OFFICE 2,400,507

METHOD AND APPARATUS FOR DETECTING DEFECTS IN FILLED CANS

Roy O. Henszey and Paul Smart, Oconomowoc, Wis., assignors to Carnation Company, Oconomowoc, Wis., a corporation of Delaware Original application May 27, 1939, Serial No. 276,050. Divided and this application January 2, 1943, Serial No. 471,138

21 Claims. (Cl. 209—75)

The present invention relates to a method and apapratus for detecting defects in filled cans. More particularly, it relates to a method and apparatus for detecting filled cans which have abnormal internal pressures.

This application is a division of application Serial No. 276,050, filed May 27, 1939, now Patent No. 2,339,638, dated January 18, 1944.

It is an object of the present invention to provide a method and apparatus for detecting filled containers having abnormal internal pressures.

Another object of the present invention is to provide a method and apparatus for testing a succession of small, filled containers to determine the internal pressure of such containers.

Still another object is to provide a method and apparatus for testing a succession of small, filled containers to determine the internal pressure of such containers and for directing those containers having abnormal internal pressure along one path and those with normal internal pressures along another.

A still further object is to provide a method and apparatus for testing a succession of filled containers at high speed to determine their internal pressures and for rejecting those of abnormal internal pressures.

Still another object is to provide a method and apparatus for detecting the internal pressures of small, filled containers and for directing those of abnormal internal pressure along one path and those of normal internal pressures along another, which method and apparatus are particularly suited for use in conjunction with methods and apparatus for testing containers for other defects, whereby to test a succession of filled containers rapidly and accurately for a number of types of defects.

A further object of the invention is to provide a method or means for detecting filled cans in which the internal pressure is above or below normal, in which the apparatus is simple and inexpensive in construction and efficient in operation and wherein there is provided means for sorting cans according to the contour thereof, preferably according to the contour of an end or ends thereof.

A still further object of the invention is to provide means for rendering a pressure testing mechanism operated in conjunction with other testing mechanism inoperative under predetermined circumstances whereby the pressure testing mechanism may be driven by means common to other testing means and may, nevertheless, be rendered inoperative without rendering such other testing means inoperative simultaneously.

Other and further objects and advantages of the invention will be apparent from the following description taken in connection with the accompanying drawings wherein.

Figures 1, 2:
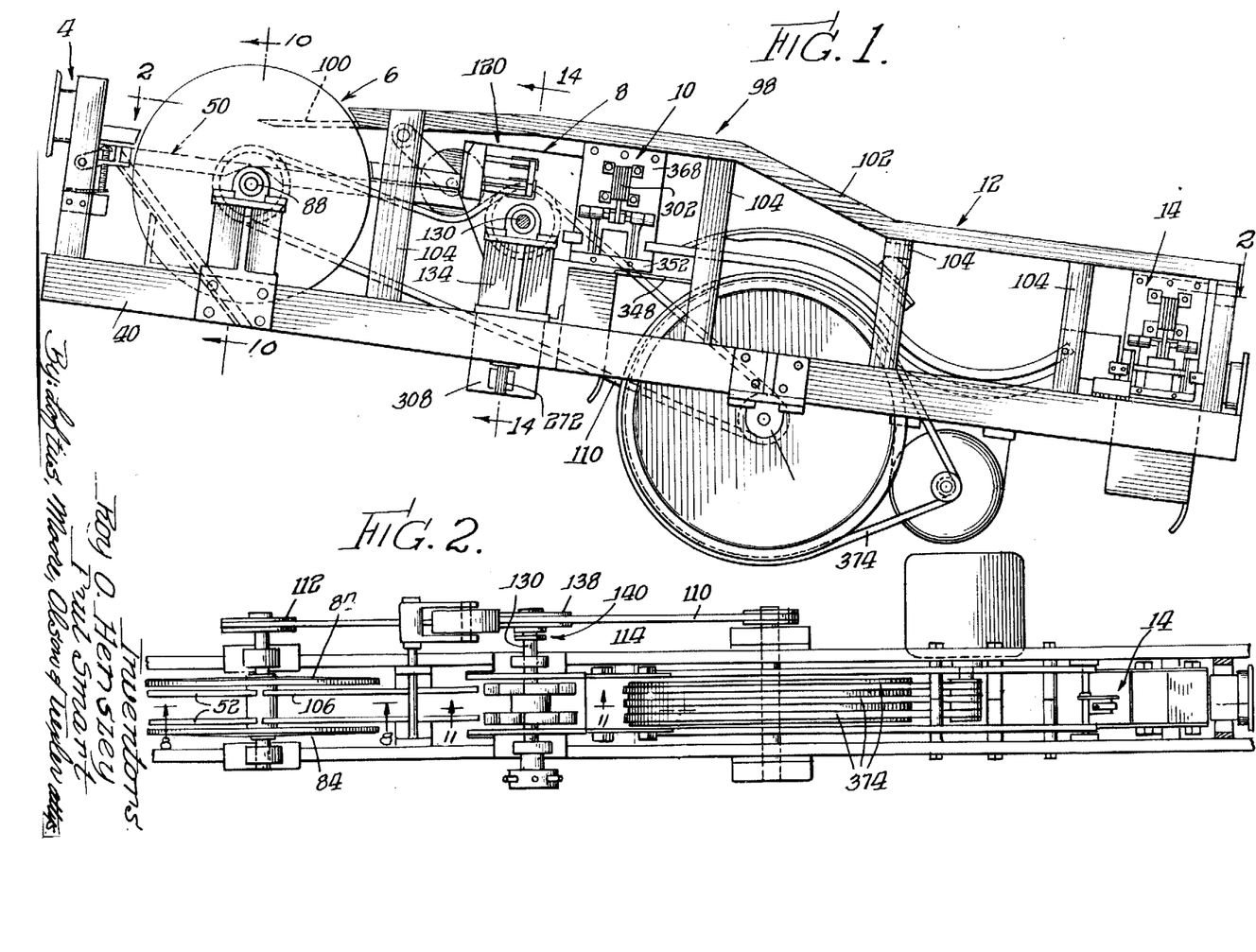
Figure 1 is a view in elevation of a portion of the machine.
Figure 2 is a section taken substantially along the line 2—2 of Figure 1.

The various testing mechanisms are preferably arranged in association with the pressure testing mechanism in the order or sequence shown in Figure 1 for a number of reasons, chiefly as follows. The size testing mechanism 6, which eliminates mashed cans or cans which are longer than normal, is preferably placed first because no type of defect which would be discovered by the subsequent testing mechanisms would interfere with the proper operation of this size testing mechanism, and because long or mashed cans would jam or impair the accuracy of the pressure testing mechanism 8, the viscosity or fluid friction mechanism 12, and the weight testing mechanism 16. The cans are next tested by the pressure testing mechanism 8 to detect and control the rejection of bloated cans in which the pressure is above normal and also cans in which the pressure is below normal. This test preferably follows the elimination of long or mashed cans because the presence of such cans in the pressure testing mechanism would interfere with its operation or impair its accuracy, and finger work may be done if only cans of the proper length are fed to the station for the testing of the pressure thereof. It is necessary in order to obtain smooth operation of the pressure testing mechanism that it operate only when cans are available for testing, and since the structure of the size testing mechanism is such as to make it convenient and economical to associate the control mechanism 4 with the inlet to the size testing mechanism, the pressure testing mechanism preferably follows immediately after the size testing mechanism. The cans passing the size and pressure tests are then tested for viscosity, and this test preferably follows the other tests, for the accuracy of the viscosity test is improved by eliminating prior thereto all over-size cans and cans of abnormal pressure, and also because long or mashed cans and bloated cans would tend to jam in the viscosity testing mechanism. It is also essential for the proper operation of the viscosity testing mechanism that the cans to be tested be delivered to the testing mechanism in spaced succession and since, as will later appear, the pressure testing mechanism discharges the tested cans in spaced succession, the viscosity testing mechanism conveniently follows this pressure testing mechanism.

Light weight testing mechanism preferably follows the other testing mechanisms, because the prior elimination of cans which are defective as to size, and pressure makes it possible to utilize a more sensitive weight testing mechanism than could otherwise be satisfactorily employed and because it has been found most convenient and economical for the feeding and discharge of cans to use the weight testing mechanism by the inspection table.

The inspection table is preferably placed last because in this position it provides means for facilitating a checking of the operation of the machine and because the prior elimination of the cans which are abnormal in size, pressure, viscosity or weight renders any defects, such as dirty or rusty cans or cans defective in some other unusual way, more conspicuous.

*Control mechanism responsive to the presence or absence of cans to be tested*

This control mechanism 4, as best shown in Figs. 3 to 9, is preferably supported or carried by a pair of spaced upright frame members 38 welded or otherwise secured at their ends to the horizontally spaced inclined main frame members 40, the upright frame members 38 held in spaced relation by reinforcing angle members or bars 42. Inclined can supporting and guiding tracks 44 of substantially L-shape in cross section at their outer ends are fastened to the inner surfaces of the upright frame members 38, the upstanding flanges of these L-shaped track members being spaced apart a distance somewhat greater than the axial length of the usual cans so as to permit long, mashed or bloated cans to pass therealong with no jamming. The tracks 44 at their outer ends support a box-like frame 46 into which extends the lower end of the gravity feed means 36, and extending between the upper transverse portion of this frame 46 and the upper spacing bar 42 are a pair of spaced rails 48 spaced from the inwardly directed flanges of the tracks 44 a distance somewhat greater than the diameter of the cans 24, and acting to insure proper positioning and rolling of the cans along the tracks 44 and preventing the cans from jumping this track or the balanced track 50.

Figures 3, 6:
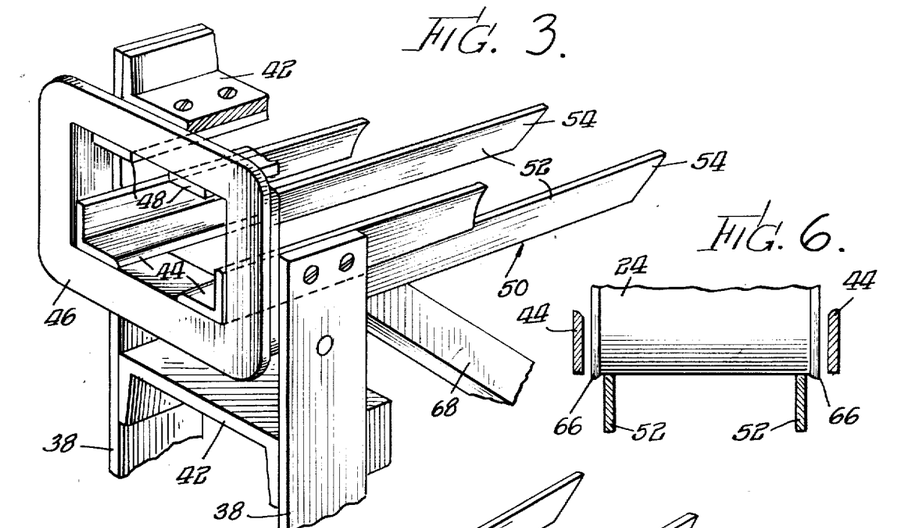
Figure 3 is a view in perspective of a part of the can feeding track, including a portion for controlling the operation of the machine.
Figures 6 and 7 are views in section taken along the line 6—6 of Figure 5 for illustrating certain features of the operation of the mechanism shown in Figure 5.
Figures 4, 7:
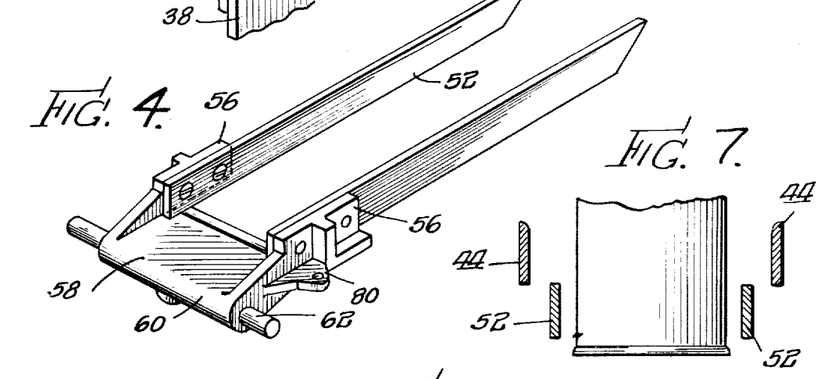
Figure 4 is a view in perspective of the machine controlling portion of the track.
Figure 5:
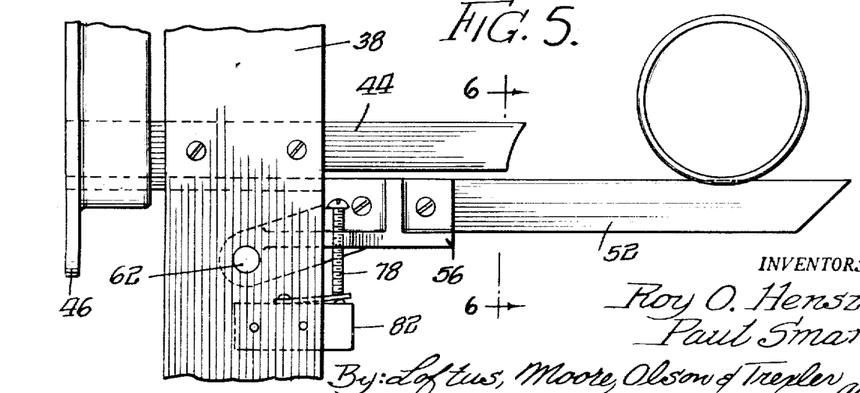
Figure 5 is a fragmentary view in elevation of the track portion shown in Figure 3.
Figure 8:
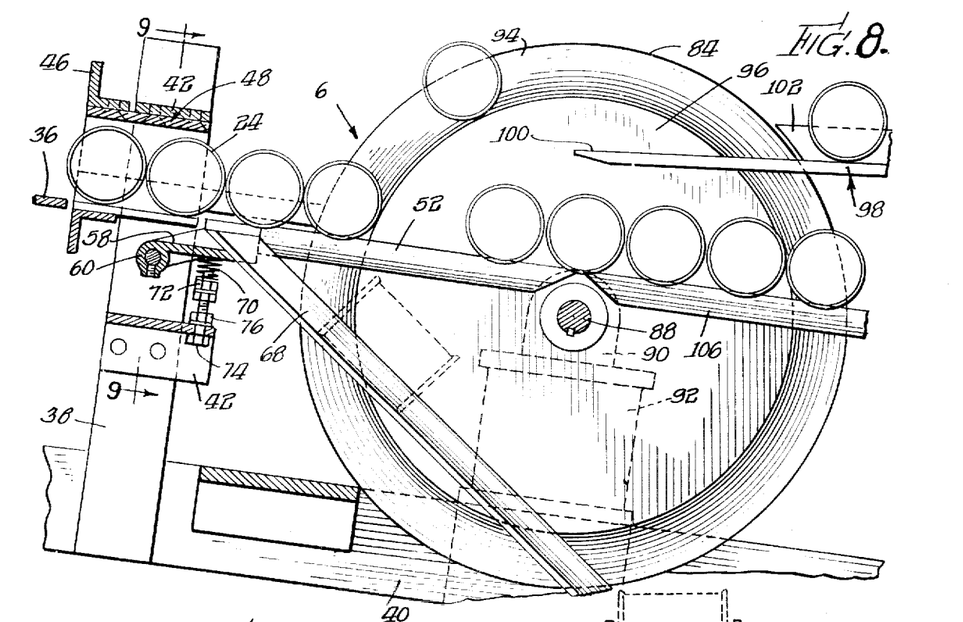
Figure 8 is a longitudinal section taken substantially along the line 8—8 of Figure 2.
Figure 9:
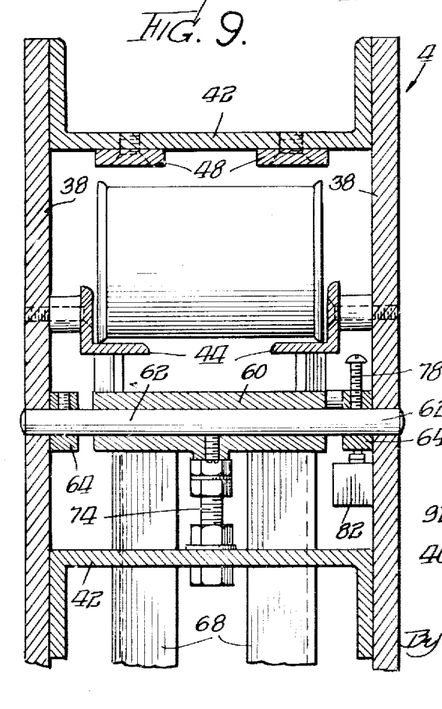
Figure 9 is a fragmentary substantially vertical section taken along the line 9—9 of Figure 8.

The balanced track 50 comprises a pair of spaced rails 52 having beveled edges 54 at one end and secured at their opposite ends to the spaced arms 56 of a mounting bracket 58 having an integral apertured boss 60 extending between the spaced arms 56 and secured to a shaft or rod 62 journaled at its opposite ends in the upright frame members 38 and held against axial movement by collars 64. The rails 52 are spaced apart, as shown in Fig. 6, a distance slightly less than the axial length of the can 24 between the top and bottom rims 66 and, as shown in Fig. 7, a distance greater than the diameter of the can and the diameter of the top and bottom rims 66 so that a can having its axis extending horizontally may roll along the rails 52, but an endwise can having its axis extending vertically will drop between the rails 52. Inclined angle bars 68 are secured at their upper ends to the uprights 38 or to the track members 44 and extend below the rails 52 to receive therefrom the endwise cans and direct the same to a point of discharge or a receptacle from which the cans may be taken and placed on the plate 26. The inwardly directed bottom flanges of the tracks 44 are cut away to receive the outer end portions of the rails 52 of the balanced track, these rails lying inwardly of the plane of the upstanding flanges of the tracks 44, with the upper edges of the rails lying in the plane and constituting extensions of the inwardly directed flanges of these tracks so that the cans will roll smoothly under the action of gravity from the tracks 44 onto and along the rails 52 to the size testing mechanism 6. The balanced track 50 includes means for urging the rails 52 in an upward direction, and this means comprises a coil spring 70 interposed between the lower surface of the bracket 58 and an adjustable nut 72 on a screw 74 secured to the lower spacing bar 42, as by the head of the screw and a locking nut 76. The screw 74 also provides adjustable stop means for engaging the bracket 58 to limit the downward deflection of the balanced track rails 52. The rails 52 of the balanced track 50 are pushed upward by the spring 70 and held downward by the weight of the cans. When the balanced track is about half full of cans it is pushed downward by the weight thereof to its normal position, in which position it acts through an adjustable screw 78 carried by a laterally projecting lug 80 on the bracket 58 to hold a circuit maker and breaker 82 of the micro switch type in open circuit position.

The micro switch 82 is moved by the resiliency of its contact and by an auxiliary spring into a circuit closing position when the balanced track under the action of the spring 70 moves upwardly, the track being less than half full of cans. The micro switch 82 controls, in a manner later to be described, the operation of the pressure testing mechanism 8 to render the same inoperative when there is an insufficient number of cans available to warrant testing thereof, and to render it operative when a sufficient number of cans are available for testing and are positioned on the balanced track 50.

Size testing mechanism

Mashed cans usually have some portion of one end bulged or bent outward, thus increasing the over-all can length. The size testing mechanism now to be described therefore provides means for detecting such mashed cans and rejecting same, as well as detecting and rejecting cans which in the process of manufacture may have exceeded the normal can length. Also, those bloated cans in which an end or ends are severely budged outwardly may also be detected and rejected by the size testing mechanism.

This size testing mechanism preferably comprises a pair of axially spaced disks 84 having the hub portions 86 secured to a shaft 88 journaled in bearing blocks 90 secured to spaced upstanding brackets 92 welded, or otherwise fastened, at their lower ends to the longitudinal main frame members 40. Each disk 84 has an outwardly flaring annular portion 94 which extends inwardly from the periphery of the disk, and the remaining portion 96 of the inner surface of each disk constitutes a plane surface substantially parallel to the like plane surface of the other disk. The plane surfaces 96 of the disks are spaced apart sufficiently to permit a can of normal over-all length to pass therebetween, but cans which are of greater over-all length will be engaged by the annular outwardly flaring portions 94 of the disks and will be carried upwardly with the disks as they rotate about the axis of the shaft 88 and deposited on an inclined track 98 which is provided with can supporting bottom rails 100 which project into the space between the disks 84, and side rails 102 which retain the cans on the rails 100 after they have rolled out of the disks 84. The track 98 may be supported on the longitudinal main frame members 40 in any convenient and desired manner, as, for example, by the spaced upright frame members 104. If desired, the track 98 may be used to convey the cans abnormal in size to a suitable receptacle, or the track may itself be used as a temporary storage place. When so used, the track preferably extends throughout the length of the machine, as shown in Fig. 1 to provide a maximum of such space.

The rails 52 of the balanced track 50 extend into a space between the disks 84, with their upper edges lying above the parallel plane which passes through the axis of the shaft 88, and these rails 52 terminate at their inner beveled edges 54 within the plane surfaces 96 of the disks 84 and adjacent to the outer end of laterally spaced rails 106. The rails 106 extend forwardly in the same plane as the rails 52 and carry the cans of normal size from the size testing mechanism 6 to the pressure testing mechanism 8.

The rails 106 form parts of a can supporting and feed track which, between the size testing mechanism 6 and the pressure testing mechanism 8, is provided with side bars 108 for maintaining the cans in proper position on the rails 106. The side bars 108, as well as the rails 106, may be secured to the upstanding frame members 104 lying between the size testing mechanism and the pressure testing mechanism. The disks 84 of the size testing mechanism may be continuously driven by means of a V belt 110 and a pulley 112 secured to one end of the shaft 88.

Pressure testing mechanism

The portion of the machine shown in the drawings including the pressure testing mechanism, the associated can directing and rejecting means, and the means controlling the operation of the pressure testing mechanism is the part of the machine which forms the subject of the present invention. As pointed out above this application is a division of a copending application Serial No. 276,050 filed May 27, 1939 entitled Method and apparatus for detecting defects in filled cans. In this copending application the machine as a whole and the viscosity mechanism in particular are claimed, together with the corresponding testing methods.

Filled cans in which the internal pressure is above normal are recognizable by the outwardly bloated end or ends of the can, and filled cans in which the internal pressure is below normal are recognizable by the inwardly bowed end or ends. Therefore, filled cans in which the contents is at an abnormal pressure may be detected by a testing of the contour of an end or ends of the can. Mashed cans also may have one or both of their ends bowed inwardly or outwardly, and, hence, such mashed cans as pass through the size testing mechanism 6 may be detected as well as the cans of abnormal pressure by means testing the contour of an end or ends of such cans.

The pressure testing mechanism 8 accordingly provides means for testing the end contour of the cans and means for controlling can directing or rejecting means 10, whereby to reject filled cans of abnormal internal pressure and cans defective in other particulars, as evidenced by their abnormal end contour.

The means for testing the contour of the end or ends of the can preferably comprises in the illustrative embodiment (Figs. 1 and 11 to 27) a "star" wheel 114 providing a plurality of angularly spaced pockets 116 for successively receiving the cans to be tested from the rails 106, and for conveying the cans in succession between spaced end contour measuring and controlling devices 118 and 120 and onto the can directing or rejecting means 10.

Figure 11:
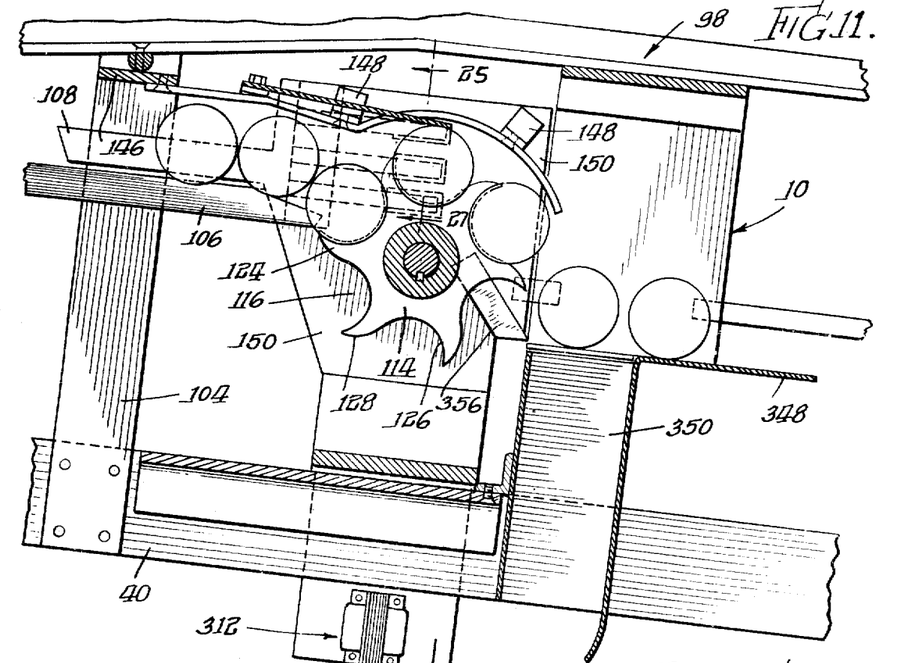
Figure 11 is a fragmentary longitudinal section through the contour testing mechanism which forms the subject of the present invention; the section being taken along the line 11—11 of Figure 2.
Figures 14, 15, 16:
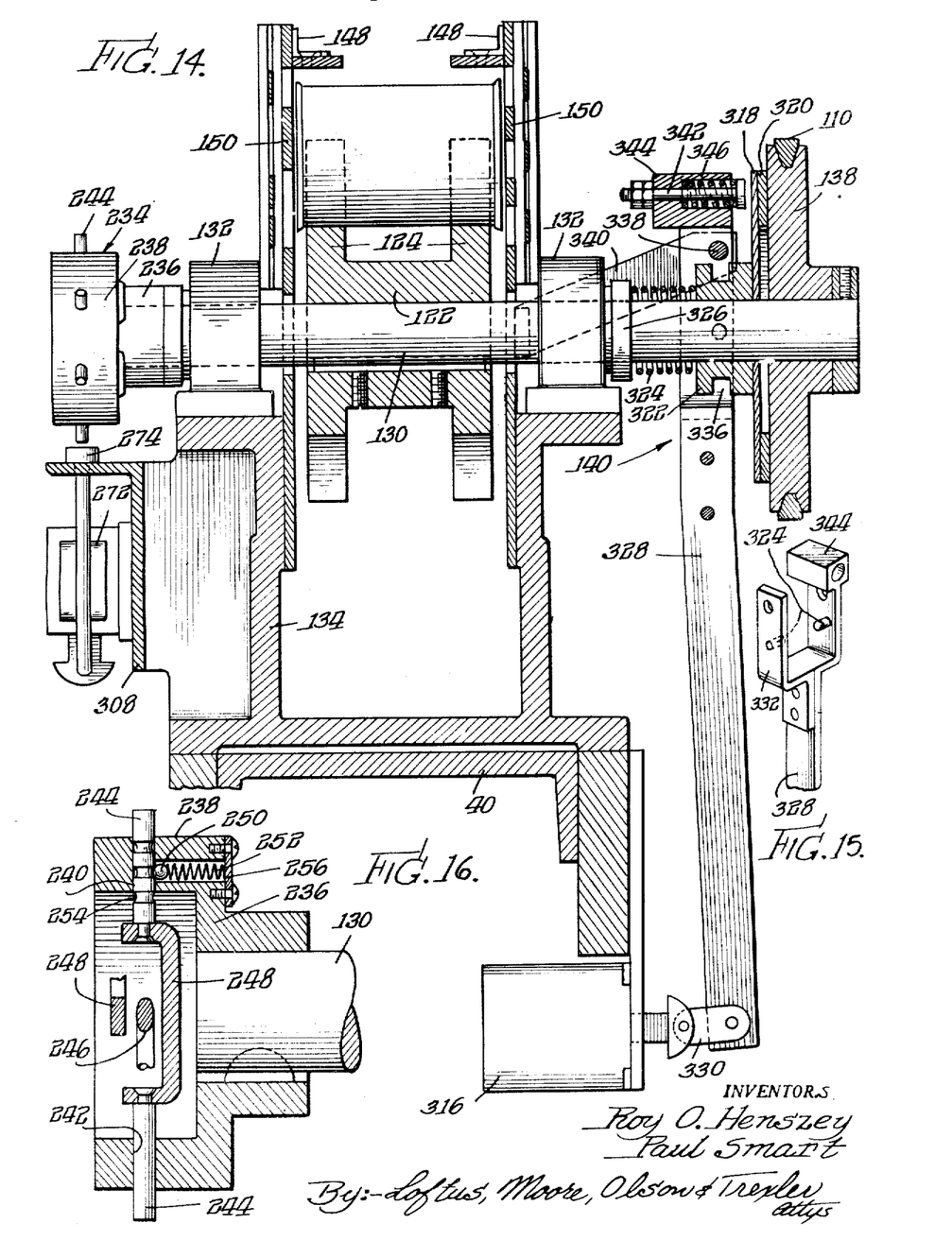
Figure 14 is a fragmentary, substantially vertical section through the contour testing instrumentality taken along the line 14—14 in Figure 1.
Figure 15 is a fragmentary view in perspective of a portion of the mechanism shown in Figure 14.
Figure 16 is a fragmentary substantially vertical section taken along the line 16—16 of Figure 17.

The wheel 114 preferably comprises a central hub portion 122, Fig. 14, and axially spaced, radially projecting arms 124 in which are provided the pockets 116, the pockets 116 being so formed as to provide a concave surface 126, Fig. 11, engaging a substantial portion of the periphery of the can, and an outer convex portion 128 merging with the concave portion whereby to facilitate the rolling of the cans into the pockets for testing thereof and out of the pockets after they have been tested. The "star" wheel is secured at its central hub portion 122 to a shaft 130 journaled in bearing blocks 132 carried by the spaced upstanding arms 134 of a bracket 136 secured at its lower end to the longitudinal main frame member or members 40. The shaft 130 is driven by the V belt 110 through the intermediacy of a pulley 138 and a clutch mechanism 140 subsequently to be described.

Figures 12, 13:
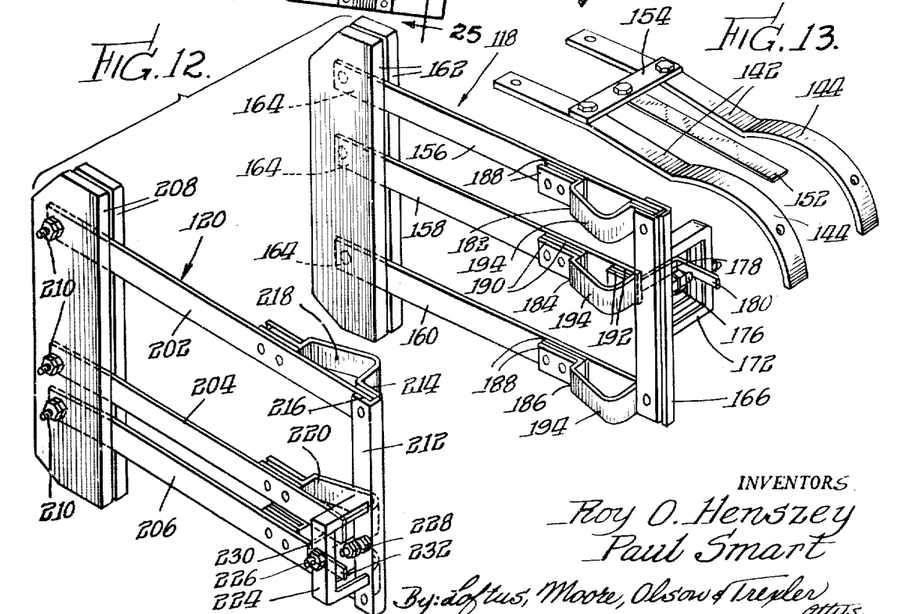
Figure 12 is an exploded view in perspective of the contour testing instrumentality.
Figure 13 is an enlarged view in perspective of a can guiding means forming part of the mechanism shown in Figure 11.

Cans are retained within the "star" wheel during their movement between the contour testing devices 118 and 120 by means of guide bars 142, Figs. 11 and 13, having semi-circular portions 144 overlying the path of movement of the cans between these testing devices, the guide bars 142 being secured at one end to a plate 146 extending laterally from an upright frame member 104. The guide bars 142 are secured intermediately by angle brackets 148 to spaced plates 150, the plates 150 being secured to the arms 134 and 136 of the bracket which supports the shaft 130, and being provided with openings through which said shaft passes, as seen in Fig. 14. A leaf spring 152, extending between and parallel to the guide bars 142, is secured to said bars as by the cross strap 154, Fig. 13, and extends in a position to overlie and frictionally contact a can during the testing of its end contour so as to prevent the can from shifting in its pocket 116 during this testing operation.

The end contour testing device 118 preferably comprises a plurality of vertically spaced bars or straps 156, 158, 160, each clamped at one end to and between spaced plates 162 which may be secured to the side bars 108 or formed integrally therewith, the bars 156, 158, 160 being fastened to the plates 162 in any convenient manner, as, for example, by rivets, bolts or the like 164. The upper and lower bars 156 and 160 are joined by an electrically conducting strap 166 and electrically insulating straps 168 and 170. The plates 162 to which the bars 156 and 160 are fastened by the bolts 164 are preferably of electrical insulating material, although if they be of metal, the bars 156 and 160 and the bolts 164 may be insulated from such metal plates. Electric connection is made to the bars 156 and 160 through one of the bolts 164 associated therewith, and both bars are maintained at the same electrical tension by means of the electrically conducting, inter-connecting strap 166.

The strap 166 carries a generally U-shaped metallic frame 172, the cross piece of the frame carrying an adjustable electric contact 174 in alinement with a like adjustable electric contact 176 carried by the strap 166.

The bar 158 terminates at its free end inwardly of the straps 166, 168, 170, and carries at its outer end an L-shaped piece or portion 178 having a forwardly projecting arm 180 forming an electric contact extending between the contacts 174 and 176 and adapted, upon flexure of the bar 158 relative to the bars 156 and 160, to engage one or the other of these contacts 176 and 174. The bar 158 is secured similarly to the bars 156 and 160, as previously described, between the insulating plates 162 although, if these plates be of metal, the bar and its clamping bolt 164 may be insulated therefrom. The electrical connection is made to the bar 158 through its clamping bolt 164.

Figures 23, 24:
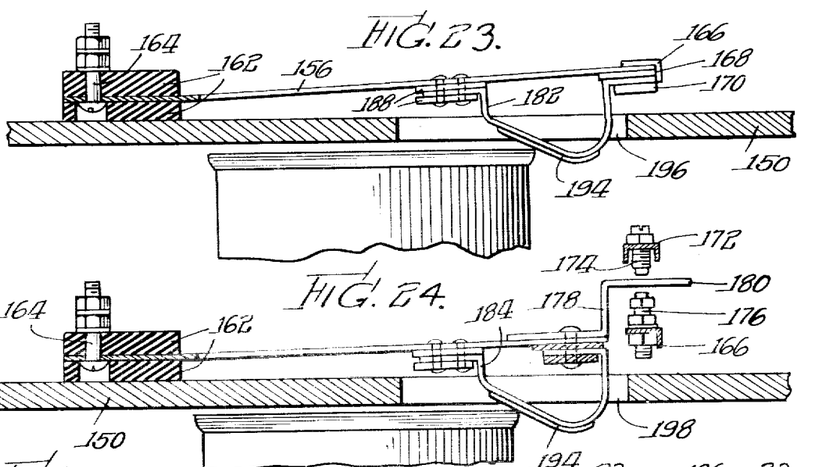
Figures 23 and 24 are sections taken along the lines 23—23 and 24—24 of Figure 25, illustrating the operation of the contour measuring means.
Figure 25:
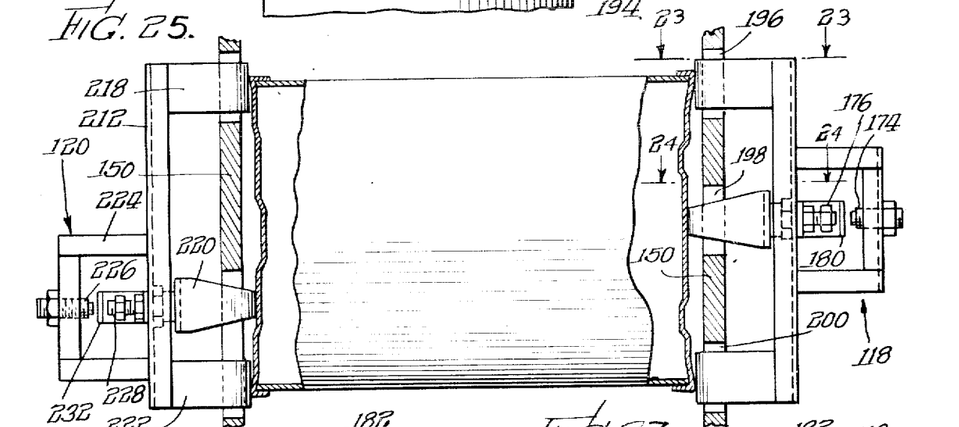
Figure 25 is an enlarged substantially vertical section taken along the line 25—25 of Figure 11 with certain parts omitted for purposes of clarity in illustration.

The bars 156, 158 and 160 are provided with similar can feelers 182, 184, 186, the feelers 182 and 186 being secured to the bars 156 and 160 between the insulating straps 168 and 170 and insulating pieces or blocks 188. The feeler 184 is secured at its opposite ends to the bar 158 by pairs of insulating blocks 190 and 192. Each of the feelers 182, 184 and 186 is provided with a can engaging cam surface 194 extending into the path of movement of an end edge of the can and at an angle to such path of movement so as to engage and be moved outwardly by the end of the can, as shown in Figs. 23 and 24, thereby flexing the bars 156, 158 and 160, the feelers 182, 184 and 186 projecting through openings 196, 198 and 200 in the adjacent plate 150. The bars 156, 158 and 160 are so spaced in relation to each other and in relation to a can in a pocket 116 of the "star" wheel 114 that the feelers 182 and 186 ride on the rim of the can, while the feeler 184 rides on some flat portion of the can near the center of the can end. The contacts 174 and 176 are so adjusted in relation to the contact 180 that there is no electrical contact on normal cans, but a can in which the end is bowed or outwardly bent beyond a limit of tolerance, which may be a few thousandths of an inch, will flex the bar 158 a greater or lesser amount relative to the bars 156 and 160, and contact 180 will thereupon engage either the contact 174 or the contact 176, depending upon whether the end of the can is bowed outwardly or inwardly.

The end contour testing device 120 for the other ends of the cans is similar in substantially all respects to the end contour testing device 118, and comprises resilient bars or straps 202, 204 and 206 each mounted at one end between a pair of insulating plates 208 by means of bolts 210 through which electrical connection may be made to one of the outer bars and to the central bar. The outer bars are joined at their free ends by a conducting strap 212 and electrically insulating straps 214 and 216. The bars are provided with can engaging feelers 218, 220 and 222, similar to the feelers 182, 184 and 186, and similarly mounted on their respective bars. The strap 212 carries a metal frame 224 similar to the frame 172 and provided with an adjustable contact 226 alined with an adjustable contact 228 carried by the strap 212. The bar 204 terminates inwardly of the strap 212 and carries an L-shaped piece or portion 230 providing a forwardly projecting electrical contact 232 extending between the contacts 226 and 228, and is similar in all respects to the contact 180. The feelers 218 and 222, like the feelers 182 and 186, ride on the rim of the can but at the opposite end thereof, while the feeler 220 carried by the central bar 204 rides near the can center on some flat portion of the can end. It will be noted that the central bar 158 of the end contour testing device 118 lies substantially centrally between the bars 156 and 160, while the central bar 204 of the contour testing device 120 lies nearer the lower bar 206 than the upper bar 202. The reason for this difference in spacing is that the two ends of a can are of different shape, and therefore it is necessary to so place the bars that their feelers 184 and 220 will at the same instant ride on flat portions of the can, which flat portions are differently located on the two ends.

Since the end rims of the cans are not rectangular but circular, and since the ends of the cans are not plane surfaces but comprise concentric, annular, relatively raised and recessed portions, means must be provided for energizing the contacts controlled by the feelers for only a short time and preferably while the outer feelers of each set engage the rim of the can at opposite ends of a diameter thereof and when the central feeler of each set engages some flat portion of a normal can end. This is accomplished by a timing and control device or means 234, Figs. 14 to 22, which comprises a drum-like member 236 keyed to one end of the shaft 130, provided in its rim 238 with a plurality of pairs of radially alined openings 240 and 242 slidably receiving radially shiftable pins 244. All of the pins 244 lie in the same plane perpendicular to the axis of the shaft 130. The pins of one pair are connected by a co-planar extension 246, which may integrally join the two pins in this pair. The other two pairs of pins are connected together by right and left generally U-shaped yoke members 248 encompassing the connection extension 246 for the first pair of pins. Each pair of pins is adapted to assume three positions: First, a neutral position in which both pins of the pair project equally beyond the periphery of the rim 238 of the drum; second, a first active position in which one pin of the pair lies flush with the periphery of the rim 238 while the other pin of the pair projects a greater than normal distance beyond the periphery of the drum; and, third, a second active position in which the end of the last mentioned pin of the pair lies substantially flush with the rim 238 while the other pin projects beyond the rim a greater than normal distance. Means are provided for retaining each pair of pins in each of these three positions.

This means comprises a spring urged ball or roller 250 mounted with its spring 252 in an axially extending opening in the rim 238 and adapted to engage in any one of the three spaced annular grooves 254 for one pin 244 of each pair of pins. The spring and ball are retained in their opening by a cover plate 256 fastened to the inner face of the drum. The pins 244 successively actuate a micro switch 258 through a lever 260 and an adjustable set screw 262 carried at the free end of the lever and adapted, upon operation of the lever 260, to engage and press the switch operating leaf spring 264. The lever 260 is pivoted to a pin or stud 266 carried by a mounting plate or bracket 268, and the lever carries intermediate its ends a cam lug 270 adapted upon rotation of the drum 236 to be engaged successively by the pins 244, thereby depressing the switch operating lever to actuate the switch 258 to a circuit closing position. The drum 236 is positioned on the shaft 130 in such angular relation to the "star" wheel 114 that a pin 244 will engage and operate the switch lever 260 at a predetermined instant when a can in one of the pockets 116 of the "star" wheel is engaged by the outer feelers of the end contour testing devices 118 and 120 on opposite ends of a diameter of the can and when the central feeler of each device is, in the case of a normal can, engaged with the flat portion of the end surface of the can. The switch 258 at this instant completes a circuit through the central bars of the devices 118 and 120 from the contacts 180 and 232 (or from the sets of contacts 174—176 and 226—228) to a pin actuating and controlling solenoid or means 272, the actuated core of which is provided with an enlarged head portion or member 274 normally underlying the path of movement of the pins 244 but adapted, upon actuation thereof, to engage and move an alined pair of pins thereabove radially with respect to the drum to project the upper pin of the pair a greater than normal distance beyond the periphery of the rim 238. Therefore, if either set of feelers due to a can abnormality establish contact between the piece 178 or the piece 230 and one of their co-operating contacts when the switch 258 is closed, a circuit, subsequently to be described, will be closed to energize the solenoid 272 which in turn, and as above described, drives upward one of the pins 244 in the pinwheel or drum 236. This actuating pin is retained in its active position by the engagement of the spring pressed ball with the innermost groove in the pin.

Figures 17, 19, 20:
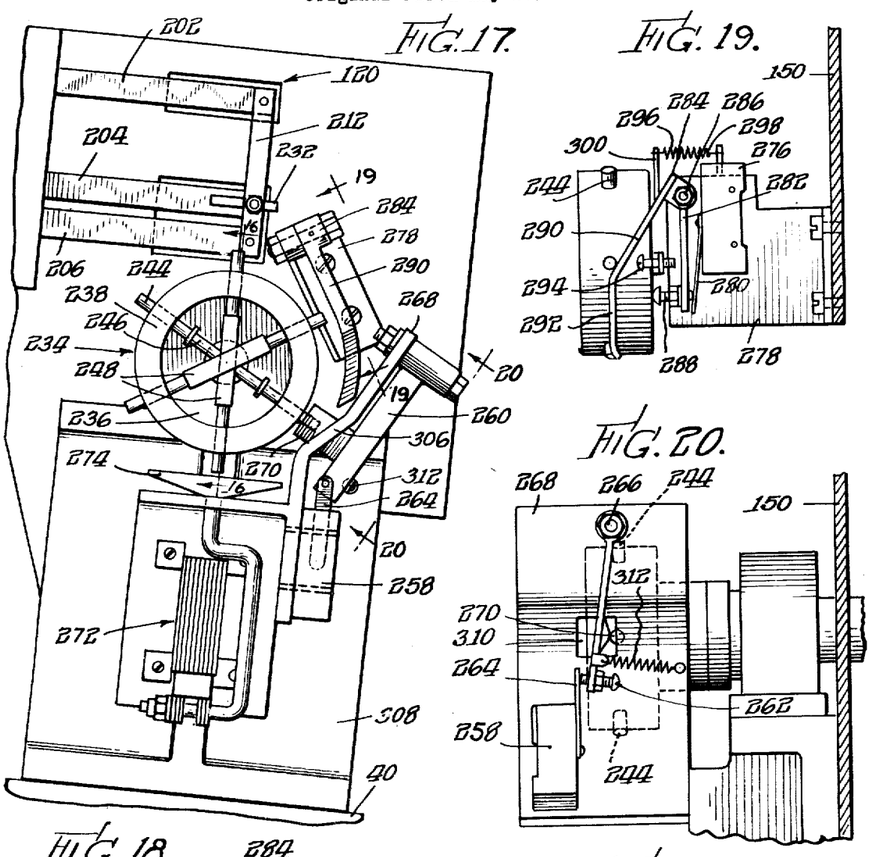
Figure 17 is a fragmentary view in elevation from the left hand side of the mechanism shown in Figure 14.
Figure 19 is a view in section taken along the line 19—19 of Figure 17.
Figure 20 is a view in section taken along the line 20—20 of Figure 17.
Figure 18:
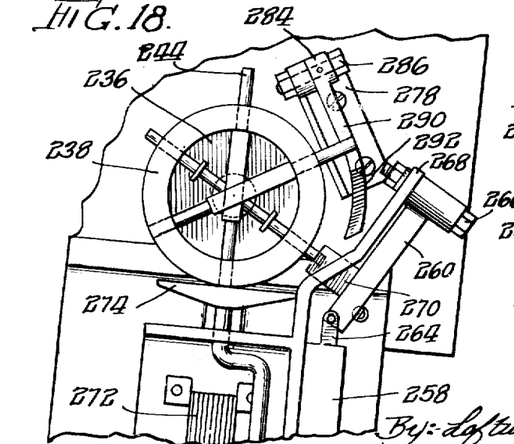
Figure 18 is a view in elevation of a portion of the mechanism shown in Figure 17 showing certain elements thereof in a different position of operation.
Figures 21, 22:
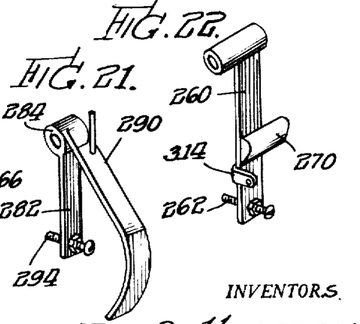
Figures 21 and 22 are views in perspective of certain switch operating members forming parts of the mechanism shown in Figures 11 and 20.

This actuated pin forms part of a means for controlling the can directing or rejecting means 10 to effect the rejection of a can having an abnormal internal pressure, as evidenced by a can having an abnormal end contour, and also to effect the rejection of cans which are defective for other reasons, and which such defects are evidenced by the abnormality of their end surfaces. This control means of which the actuated pin forms a part comprises a micro switch 276 mounted on a plate 278 bolted to one of the plates 150, the switch being provided with a resilient actuating strip or bar 280 adapted to be engaged by the arm 282 of a switch operating lever mechanism 284 pivoted on a stud 286 carried by the mounting plate 278. The arm 282 of the lever mechanism carries an adjustable set screw 288 for determining the amount of movement required of the lever mechanism to operate the switch 276. The other arm 290 of the lever mechanism 284 extends outwardly from the pivot stud 286 into the path of movement of an outwardly pre-set pin 244, as shown in Figs. 18 and 19, and this arm is further provided with an outer end portion 292 lying substantially in the plane of the pins 244 but formed as an arcuate portion concentric to the axis of the pinwheel or drum 236 and extending to a point, as shown in Fig. 17, closely adjacent the cam block or lug 270 carried by the switch arm 260. The outer movement of the lever mechanism 284 is limited by an adjustable stop 294 positioned to engage the lever arm 282, and is held in this position by a spring 296 extending between a first lug 298 of the mounting plate 278 and a lug 300 carried by lever arm 290.

Figure 29:
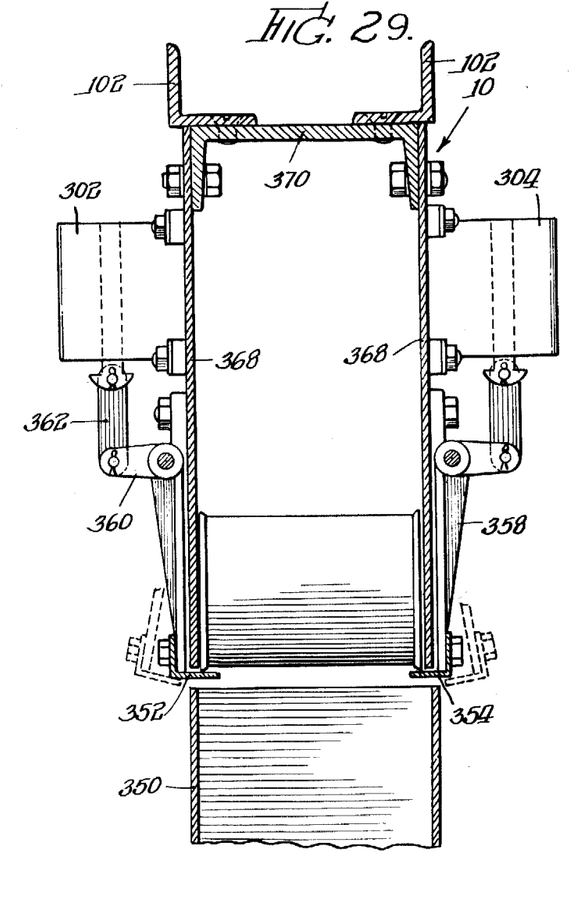
Figure 29 is a view in substantially vertical section taken along the line 29—29 of Figure 28.

The micro switch 276 controls the operation of gate actuating solenoids 302 and 304, Fig. 29, which form part of the can directing or rejecting means 10.

The actuated pins are returned to normal or neutral position by a cam 306 formed as an integral part of the mounting bracket 268, which bracket is mounted on a mounting bracket 308 for the solenoid 272. The bracket 308 is in turn mounted upon the supporting bracket for the shaft 130, as best shown in Fig. 14. The bracket 268 is provided with an opening 310 through which the cam lug 270 projects, and an edge of this opening limits the outward movement of the lever arm 260 under the action of a spring 312 secured between a pin carried by the bracket 268 and a lug 314 formed on the lever arm 260.

Figure 26:
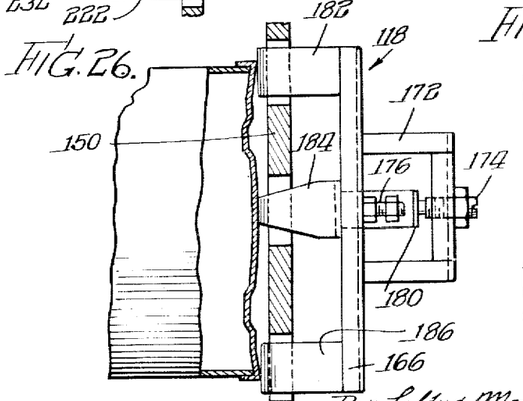
Figures 26 and 27 are views of a portion of Figure 25 but with the parts in different positions of operation.
Figure 27:
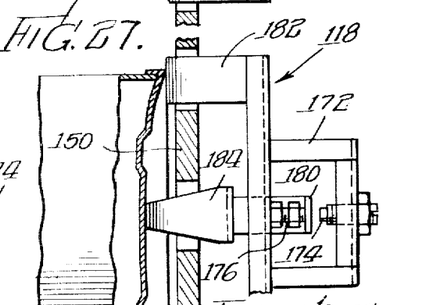
Figure 28:
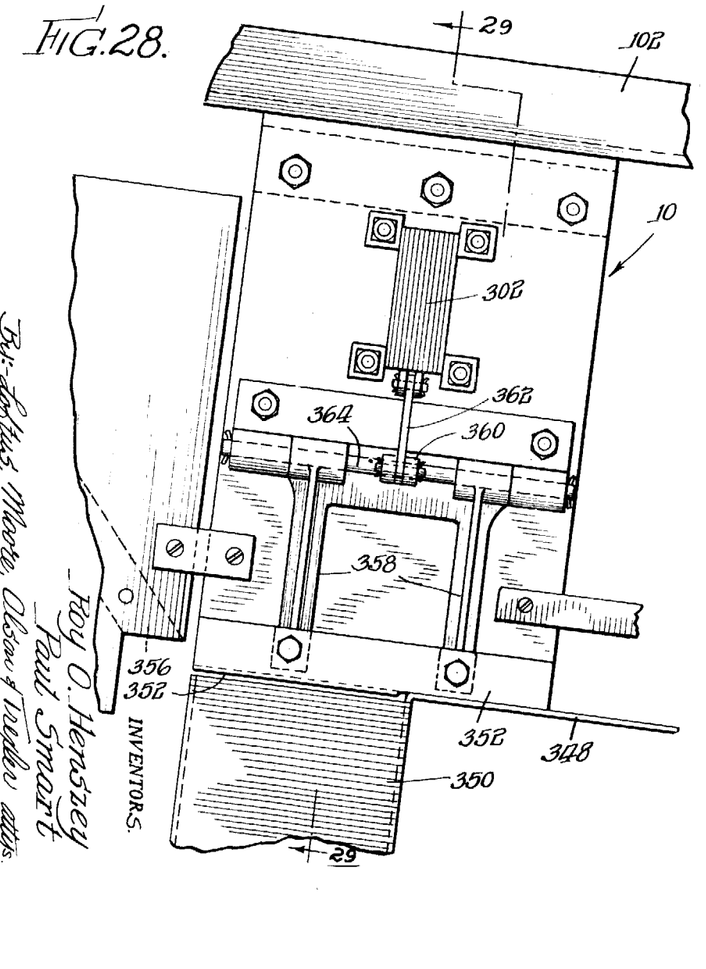
Figure 28 is a fragmentary view in elevation of the can directing and rejecting means controlled by the contour measuring mechanism of Figures 11 to 27.

It is apparent from the foregoing description that as the pinwheel or drum 236 revolves, the pins successively actuate the switch 258 to energize the switches of the end contour testing devices 118 and 120. If, at this energized instant, the feelers of these devices engage a can end of abnormal contour, the central feelers of these testing devices 118 and 120 will be flexed relative to the outer sets of feelers, as shown in Figs. 26 and 27, to complete a circuit, as previously described, to the solenoid 272 which also, as previously described, pre-sets one of the pins to a position projecting a greater than normal distance beyond the periphery of the drum 236. This pre-set pin moves, as will be evident, in exact synchronism with the tested can, and as the pinwheel or drum revolves it engages the lever mechanism 284 to actuate the switch 276 to control the actuating solenoids 302 and 304 and the can rejecting or directing means 10. As the pre-set pin passes beyond the switch operating lever mechanism 284 it is engaged by the cam surface 306, to be thereby returned to neutral position with respect to the wheel or drum 236, and it simultaneously engages the cam lug 270 to energize the contacts of the end contour testing devices 118 and 120, there being at this instant a can properly positioned between these testing devices.

As previously indicated, the operation of the pressure testing mechanism 8 is controlled by the control mechanism 4 to be rendered inoperative if no cans are available for testing, and to be rendered operative only when cans are available for testing. For this purpose the clutch mechanism 140, which operates to connect the driving pulley 138 to the shaft 130, is controlled by solenoid 315 energized by the switch 82, through a circuit subsequently to be described, the switch 82 being actuated, as previously described, by the balanced track 50.

The clutch mechanism 140 comprises a disk or plate 318 provided with a friction ring or annulus 320 adapted to engage a face of the pulley 138, the plate 318 being carried by a grooved collar 322 splined on the shaft 130 for rotation therewith and for axial movement relative thereto to withdraw the friction ring 320 from contact with the pulley 138. The friction ring 320 is normally held in contact with the pulley by a coil spring 324 embracing the shaft 130 and interposed between the grooved collar 322 and a collar or abutment 326. The solenoid 316 actuates the collar 322 axially of the shaft against the force of the spring 324 to release the clutch mechanism through a lever 328 connected with the armature of the solenoid by a link 330, the lever 328 being provided at its upper end with a substantially U-shaped yoke 332 having inwardly projecting pins 334 engaging in the groove 336 in the collar 322. The lever 328 is pivoted at its upper end by means of a pin or pins 338 passing through openings in the arms in the U-shaped yoke 332 and carried by a mounting plate or plates 340 secured to one of the plates 150, Fig. 14. Means are provided for stopping the clutch plate 318 and the shaft 130 when the clutch is operated by solenoid 316, and this means or brake comprises a plunger 342 slidably mounted in a housing 344 carried and adjustably mounted in a housing 344 carried at the upper end of one of the arms of the U-shaped yoke 332. The plunger 342 is resiliently urged into braking position by an embracing coil spring 346 interposed between the head of the plunger and the bottom of a receiving opening in the housing 344. It will be evident that when the solenoid 316 is energized, the clutch operating lever 328 will be moved in a clockwise direction, as seen in Fig. 14, about its pivot stud 338, thereby to move the clutch collar 322 axially of the shaft 130 away from the pulley 138, this collar in turn moving the clutch ring 320 out of engagement with the pulley and the clutch collar carrying the plate 318 into braking engagement with the braking plunger 342 which thereby brings the clutch plate and the shaft 130 quickly to rest.

The can directing or rejecting means 10 comprises a track 348 along which normal cans are directed to the viscosity or fluid friction testing mechanism 12, a track or channel 350 along which cans of abnormal contour are directed to a point of discharge or a suitable receptacle, and a pair of gates or control members 352 and 354 controlled by the solenoids 302 and 304 for selectively directing the cans to the tracks 348 and 350. Cans are delivered to the gates 352 and 354 from the "star" wheel 114 by means of a sharply inclined track 356, Fig. 11, on which the cans are moved by the "star" wheel as it rotates, the track 356 being carried by one or both of the plates 150 of the pressure testing mechanism.

The gates 352 and 354 may comprise angle bars, each secured to the outer ends of the arms 358 of a bell crank, the other arm 360 of which is connected to the core of the actuating solenoids 302 and 304 by means of a link 362. The bell cranks 358 are pivoted by shafts 364 to brackets 366 carried by spaced supporting plates 368 also forming guide rails limiting the sidewise movement of the cans. The supporting and guiding plates 368 are fastened to an angle bar 370, in turn secured to the rails 102 of the inclined track 98. When the switch 276, Fig. 19, is actuated by the lever mechanism 284 in response to the presence of a defective can at the point of discharge of the pressure testing mechanism, the solenoids 302 and 304 are simultaneously energized to move the gates 352 and 354 outwardly to uncover the reject channel or track 350, the switch 276 being held closed by a pin 244 acting through the lever mechanism 284 until the defective can has rolled down the track 356 and into the reject channel 350. The actuating pin 244 then releases the lever mechanism 284 and the switch 276, the solenoids 302 and 304 are de-energized and the gates 352 and 354 returned to normal closed position by the weight of the cores of the solenoids or by auxiliary springs, if desired. A can of normal end contour will not cause actuation of the switch 276 and, hence, such can, when discharged from the "star" wheel 114 will roll along the track 356 onto the gate bars 352 and 354 and across to the track 348 by which such cans are fed to the viscosity or fluid friction testing mechanism 12.

Figure 10:
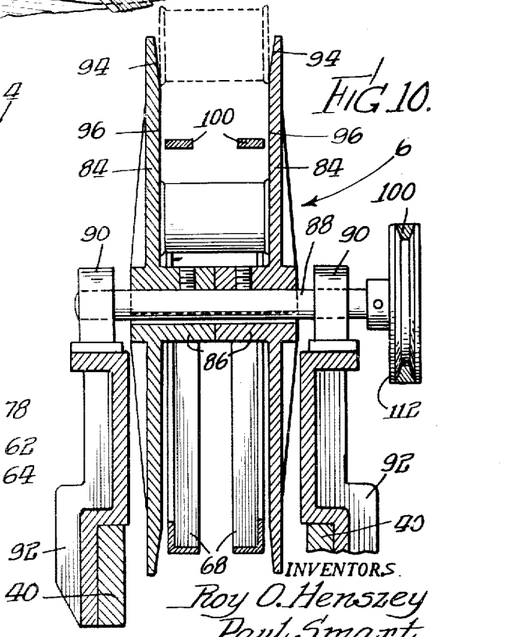
Figure 10 is a fragmentary substantially vertical section taken along the line 10—10 of Figure 1.

The jamming up of cans in the size testing mechanism 6 due to a stoppage of the pressure testing mechanism, will not, of course, damage the size testing mechanism, for the cans of normal length which are at the moment positioned between the plane surfaces 96 of the disks 84 (Figs. 8 and 10) will simply rest on the track rails 52 and 106 passing through these disks, and this line of cans will prevent the gravity feed of more cans to the disks 84.

*Operation of the machine*

In operation, cans are fed into the control mechanism or track 4 and along the rails 52 of which (Figure 8) the cans roll into the size-testing mechanism 6. Cans of abnormal length cannot pass between the rotating disks 84 of this size-testing mechanism and are, therefore, carried by the peripheral portion 94 of these disks upwardly and deposited on the inclined storage track 98. Cans of normal length roll freely between these disks 84 onto the rails 106, by which they are fed into the pressure-testing mechanism 8. Filled cans which are defective in respect to the abnormality of the pressure of their contents, or which are defective in other respects as evidenced by the abnormality of their end contours, are detected in this mechanism. Such defective cans are directed or fed into the rejecting channel 350 (Figure 11) through the can-directing or rejecting means 10, the operation of which is determined, as previously described, by the pressure-testing mechanism 8. Cans of normal internal pressure and end contour freely roll or pass through the gates of the can-directing or rejecting means 10 and are fed along the gravity track 348 into the viscosity-testing mechanism 12. Every filled can, passing into the viscosity-testing mechanism 12, is first rotated in one direction and then fed onto the gravity track section along which the cans tend to rotate in a direction opposite to the previous direction of rotation of the can and opposite to the direction of rotation of the contents of the can, so that cans are projected from the end of the gravity track section at different speeds and different trajectories in accordance with the viscosity of the can contents.

It will be evident from the foregoing description that applicant has provided a method and apparatus for detecting bloated cans or cans having abnormal internal pressures, as evidenced by their end contours, and for rejecting or directing along one path the filled containers, the contents of which are of abnormal internal pressure and for directing along another path the containers the contents of which are of normal internal pressure. It will be further evident that the method and apparatus are particularly adapted for rapidly and efficiently testing a succession of small, filled containers. It will also be apparent that this method and apparatus will be adapted for use in conjunction with other methods and apparatus for testing containers for other defects, such as abnormal length, abnormal viscosity and abnormal weight.

Changes may be made in the form, construction and arrangement of the parts without departing from the spirit of the invention or sacrificing any of its advantages, and the right is hereby reserved to make all such changes as fairly fall within the scope of the following claims.

We claim:

1. A mechanism for detecting filled cans having abnormal internal pressures, which comprises can-conveying means, switch-carrying means including relatively shiftable members adapted to engage an end of each can carried by said conveying means and to be deflected relatively different distances in accordance with the axial distances between predetermined radially spaced areas on end surfaces of the cans, means receiving cans from said conveying means for directing the cans selectively in different directions, electrically operable means operatively controlled by said switch-carrying means for controlling the can-receiving and directing means, and means for preventing control of said electrically operable means by said switch-carrying means except when the movable members of said switch-carrying means engage predetermined points on the end surface of the can.

2. A mechanism for detecting filled cans having abnormal internal pressures, which comprises can conveying means, separate switch-carrying means adapted to simultaneously engage the opposite ends of a can carried by said conveying means, each of said switch-carrying means including relatively shiftable members engaging the end of the can and adapted to be deflected relatively different distances in accordance with the axial distances between predetermined radially spaced points on the end surfaces of the cans, means receiving cans from said conveying means for directing the cans selectively in different directions, an electrically operable means operatively controlled by either of said separate switch means for controlling said can receiving and directing means to control the same whereby cans either end of which is abnormal are directed by said receiving and directing means in a different direction than cans of normal pressure.

3. A mechanism for detecting filled cans having abnormal internal pressures, which comprises can conveying means, switch-carrying means including relatively movable members adapted to engage an end of each can carried by said conveying means at spaced apart areas on the end of the can and to be deflected relatively different distances in accordance with the axial distance between the points of engagement with the can end, means receiving cans from said conveying means for directing the cans selectively in different directions, electrically operable means controlled by said switch-carrying means for operatively controlling presettable means for operating the can directing means to cause the can directing means to direct cans of abnormal internal pressures in a different direction than normal cans, and means for preventing control of said electrically operable means by said switch-carrying means except when the movable members of said switch-carrying means engage the end surface of a can at predetermined points.

4. A mechanism for detecting filled cans having abnormal internal pressures, which comprises can conveying means, separate switch-carrying means adapted to simultaneously engage the opposite ends of each can carried by said conveying means, each of said switch-carrying means including relatively movable members adapted to engage the end of the can at spaced apart areas on the end of the can and to be deflected relatively different distances in accordance with the axial distances between the points of engagement with the can ends, means receiving cans from said conveying means for directing the cans selectively in different directions, electrically operable means controlled by either of said switch-carrying means for operatively controlling presettable means for operating the can directing means to cause the can directing means to direct cans of abnormal internal pressures in a different direction than normal cans, and means for preventing control of said electrically operable means by said switch-carrying means except when the movable members of said switch-carrying means engage the end surface of a can at predetermined points.

5. A mechanism for detecting filled cans having abnormal internal pressures, which comprises means for conveying cans continuously past a station, relatively movable members at said station adapted to engage an end of each can carried past said station at spaced apart areas on the end of the can and to be deflected by each can relatively different distances in accordance with the axial distances between the points of engagement with the can end, means receiving cans from said conveying means for directing the cans selectively in different directions, and means actuatable by said relatively movable surface engaging members when said surface engaging members engage the end of a can at predetermined points, said actuatable means being operatively connected to said can receiving and directing means to control the same whereby abnormal cans are directed by said receiving and directing means in a different direction than cans of normal pressures.

6. A mechanism for detecting filled cans having abnormal internal pressures, which comprises means for conveying cans continuously past a station, separate sets of relatively movable members at said station adapted to simultaneously engage the opposite ends of each can carried past said station, each set of members engaging the end of the can at spaced apart areas and each set being adapted to be deflected by each can relatively different distances in accordance with the axial distance between the points of engagement with the can end, means receiving cans from said conveying means for directing the cans selectively in different directions, and means actuatable by either of said relatively movable sets of members when said members engage each end of a can at predetermined points, said actuatable means being operatively connected to said can receiving and directing means to control the same whereby abnormal cans are directed by said receiving and directing means in a different direction than cans of normal pressures.

7. A mechanism for detecting filled cans having abnormal internal pressures, which comprises means for conveying cans continuously past a station, switch-carrying means at said station including relatively movable members adapted to engage an end of each can carried past said station at spaced apart areas on the end of the can and to be deflected relatively different distances in accordance with the axial distance between the points of engagement with the can end, means receiving cans from said conveying means for directing the cans selectively in different directions, electrically operable means operatively controlled by said switch-carrying means for controlling the can receiving and directing means to cause the can directing means to direct cans of abnormal internal pressures in a different direction than normal cans, and means for preventing control of said electrically operable means by said switch-carrying means except when the movable members of said switch-carrying means engage the end surface of a can at predetermined points.

8. A mechanism for detecting filled cans having abnormal internal pressures, which comprises means for conveying cans continuously past a station, separate switch-carrying means at said station adapted to simultaneously engage the opposite ends of each can carried past said station, each of said switch-carrying means including relatively movable members adapted to engage the end of the can at spaced apart areas and to be deflected relatively different distances in accordance with the axial distances between the points of engagement with the can ends, means receiving cans from said conveying means for directing the cans selectively in different directions, electrically operable means operatively controlled by either of said switch-carrying means for controlling the can receiving and directing means, and means for preventing control of said electrically operable means by said switch-carrying means except when the movable members of said switch-carrying means engage the end surface of a can at predetermined points.

9. A mechanism for detecting filled cans having abnormal internal pressures, which comprises means for conveying cans continuously past a station, relatively shiftable members in said station adapted to engage an end of each can at spaced apart areas and to be deflected by each can relatively different distances in accordance with the axial distance between the points of engagement with the can end, means receiving cans from said conveying means for directing the cans selectively in different directions, means actuatable by said relatively movable members and operatively connected to said can receiving and directing means to direct abnormal cans in a different direction than normal cans, and means for preventing actuation of said actuatable means by said members except at spaced points on said conveying means at which the ends of cans carried thereby are engaged by said members at predetermined spaced apart points.

10. A mechanism for detecting filled cans having abnormal internal pressures, which comprises means for conveying cans continuously past a station, separate sets of relatively shiftable members in said station adapted to engage the opposite ends of a can simultaneously, each set of members including members engaging the ends of the can at spaced apart areas and adapted to be deflected relatively different distances in accordance with the axial distance between the points of engagement with the can ends, means receiving cans from said conveying means for directing the cans selectively in different directions, means actuatable by either of said sets of relatively movable members and operatively connected to said can receiving and directing means to cause the directing means to direct abnormal cans in a different direction than normal cans, and means for preventing actuation of said actuatable means by said members except when said members engage the end of a can at predetermined spaced apart points.

11. A mechanism for detecting filled cans having abnormal internal pressures which comprises can conveying means, switch-carrying means including three relatively shiftable members adapted to engage an end of each can carried by said conveying means and to be deflected relatively different distances in accordance with the axial distance between their points of engagement with the can end, two of said members at one stage contacting the rim of the can at spaced points and a third member contacting the can at a point on the end spaced inwardly from the rim, means receiving cans from said conveying means for directing the cans selectively in different directions, electrically operable means operatively controlled by said switch-carrying means for controlling said can receiving and directing means to cause the can directing means to direct cans of abnormal internal pressures in a different direction than normal cans and means for preventing control of said electrically operable means by said switch-carrying means except at said one stage when the two movable members of said switch-carrying means engage the rim of the can at spaced points and the third engages the end of the can at a point spaced inwardly from the rim.

12. A mechanism for detecting filled cans having abnormal internal pressures, which comprises can conveying means, separate switch-carrying means adapted to simultaneously engage the opposite ends of each can carried by said conveying means, each of said switch-carrying means including three relatively shiftable members adapted to engage the end of the can and to be deflected relatively different distances in accordance with the axial distance between their points of engagement with the can end, two of said members in each set at one stage contacting the rim of the can at spaced points and the third member in each set contacting the can at a point on the end spaced inwardly from the rim, means receiving cans from said conveying means for directing the cans selectively in different directions, electrically operable means operatively controlled by either of said switch-carrying means for controlling said can receiving and directing means to cause the can directing means to direct cans of abnormal internal pressures in a different direction than normal cans, and means for preventing control of said electrically operable means by said switch-carrying means except when the two movable members of said switch-carrying means engage the rim of the can at spaced points and the third engages the end of the can at a point spaced inwardly from the rim.

13. A method of handling filled cans which comprises feeding the cans along a given path, testing the cans for length and removing those of abnormal length, and testing the remaining cans moving along said path for internal pressure by determining the contour of both ends thereof simultaneously and removing those cans having abnormal internal pressures.

14. A machine for handling filled containers which comprises means for feeding the containers along a given path, means at a first station for testing the containers for length and for discharging those of abnormal length in one direction and those of normal length in another direction, and means at a second station receiving the cans of normal length from said first testing means for testing the end contour of both ends of the received containers simultaneously to determine the internal pressures of their contents, and means operatively controlled by said last-mentioned testing means for separating the containers the contents of which are of abnormal internal pressures from containers the contents of which are of normal pressures.

15. A machine for handling filled containers, which comprises means for feeding the containers along a given path, means at a first station for testing the containers for length and for discharging those of abnormal length from said path and directing along said path those of normal length, means at a second station receiving the cans of normal length from said first testing means for testing the end contour of the received containers to determine the internal pressure of their contents, said means at a second station comprising a pair of members contacting the rim of the can at spaced points and a third member contacting the end of the can at a point spaced inwardly from the rim, said members being relatively movable axially of the can, and means operatively controlled by said means at a second station for separating the containers the contents of which are of abnormal pressures from containers the contents of which are of normal pressures.

16. A machine for handling filled containers, which comprises means for feeding the containers along a given path, means at a first station for testing the containers for length and for discharging those of abnormal length from said path and directing along said path those of normal length, means at a second station receiving the cans of normal length from said first testing means for testing the end contour of both ends of the received containers simultaneously to determine the internal pressures of their contents, said means at a second station comprising separate sets of members for testing the end contour of the opposite ends of the containers, each of which sets of members comprises a pair of members contacting the rim of the can at spaced points and a third member contacting the end of the can at a point spaced inwardly from the rim, the members in each set being movable relative to each other axially of the can, and means operatively controlled by each of said sets of members for separating the containers the contents of which are of abnormal internal pressures from containers the contents of which are of normal pressures.

17. A mechanism for detecting filled cans having abnormal internal pressures, which comprises means for conveying cans continuously past a station, relatively movable members at said station mounted in position to be engaged at spaced points by an end surface of each can carried past said station and movable by each can relative to their mounting in a direction away from the can different distances in accordance with the distance between said points in a direction transverse to said end, and means actuated by at least one of said members on abnormal relative movement of said members with respect to one another for indicating a filled can of abnormal internal pressure.

18. A mechanism for detecting filled cans having abnormal internal pressures, which comprises means for conveying cans continuously past a station, relatively movable members at said station mounted in position to be engaged at spaced points by an end of each can and movable by each can relative to their mounting in a direction away from the can relatively different distances in accordance with the distance between predetermined points on an end surface of the can in a direction axially of the can, and electrically operated means operably controlled by at least one of said members on abnormal relative movement of said members with respect to one another for indicating a filled can of abnormal internal pressure.

19. A mechanism for detecting filled cans having abnormal internal pressures, which comprises means for conveying cans continuously past a station, relatively movable members at said station mounted in position to be engaged at spaced points by an end surface of each can carried past said station and movable by each can relative to their mounting in a direction away from the can relatively different distances in accordance with the distance between said points in a direction transverse to said end, means receiving cans from said conveying means for directing the cans selectively in different directions and means actuatable by said relatively movable surface-engaging members upon movement with respect to one another and operatively connected to said can receiving and directing means to control the same whereby abnormal cans are directed by said receiving and directing means in a different direction than cans of normal pressures.

20. A mechanism for detecting filled cans having abnormal pressures, which comprises means for conveying cans continuously past a station, relatively movable switch carrying means at said station mounted in a position to be engaged at spaced points by an end surface of each can carried past that station and movable by each can relative to their mounting in a direction away from the can and axially thereof relatively different distances in accordance with the distance between said points, means receiving cans from said conveying means for directing the cans selectively in different directions, and electrically operable means operatively controlled by said switch carrying means for controlling said can receiving and directing means to control the same whereby abnormal cans are directed by said receiving and directing means in a different direction than cans of normal pressure.

21. A mechanism for detecting filled cans having abnormal internal pressures, which comprises means for conveying cans continuously past a station, separate sets of relatively movable members at said station mounted in a position to be engaged at spaced points by opposite end surfaces of each can carried past said station and movable by each can relative to their mountings in directions away from the can different distances in accordance with the distances between said points in directions transverse to said ends, and means actuated by said members on abnormal relative movement of the members in either set with respect to one another for indicating a filled can of abnormal internal pressure.

ROY O. HENSZEY.
PAUL SMART.

Certificate of Correction

Patent No. 2,400,507.   May 21, 1946.

ROY O. HENSZEY ET AL.

It is hereby certified that errors appear in the printed specification of the above numbered patent requiring correction as follows: Page 1, first column, line 2, for "apapratus" read *apparatus*; page 2, first column, line 5, for "11 and 20" read *11 to 20*; line 22, strike out "various" before "testing"; line 45, for "finger" read *finer*; page 3, first column, line 46, for "budged" read *bulged*; and that the said Letters Patent should be read with these corrections therein that the same may conform to the record of the case in the Patent Office.

Signed and sealed this 25th day of February, A. D. 1947.

[SEAL]

LESLIE FRAZER,
*First Assistant Commissioner of Patents.* whereby abnormal cans are directed by said receiving and directing means in a different direction than cans of normal pressures.

20. A mechanism for detecting filled cans having abnormal pressures, which comprises means for conveying cans continuously past a station, relatively movable switch carrying means at said station mounted in a position to be engaged at spaced points by an end surface of each can carried past that station and movable by each can relative to their mounting in a direction away from the can and axially thereof relatively different distances in accordance with the distance between said points, means receiving cans from said conveying means for directing the cans selectively in different directions, and electrically operable means operatively controlled by said switch carrying means for controlling said can receiving and directing means to control the same whereby abnormal cans are directed by said receiving and directing means in a different direction than cans of normal pressure.

21. A mechanism for detecting filled cans having abnormal internal pressures, which comprises means for conveying cans continuously past a station, separate sets of relatively movable members at said station mounted in a position to be engaged at spaced points by opposite end surfaces of each can carried past said station and movable by each can relative to their mountings in directions away from the can different distances in accordance with the distances between said points in directions transverse to said ends, and means actuated by said members on abnormal relative movement of the members in either set with respect to one another for indicating a filled can of abnormal internal pressure.

ROY O. HENSZEY.
PAUL SMART.

Certificate of Correction

Patent No. 2,400,507.    May 21, 1946.

ROY O. HENSZEY ET AL.

It is hereby certified that errors appear in the printed specification of the above numbered patent requiring correction as follows: Page 1, first column, line 2, for "apapratus" read *apparatus*; page 2, first column, line 5, for "11 and 20" read *11 to 20*; line 22, strike out "various" before "testing"; line 45, for "finger" read *finer*; page 3, first column, line 46, for "budged" read *bulged*; and that the said Letters Patent should be read with these corrections therein that the same may conform to the record of the case in the Patent Office.

Signed and sealed this 25th day of February, A. D. 1947.

[SEAL]

LESLIE FRAZER,
*First Assistant Commissioner of Patents.*